(12) United States Patent  
Flynn et al.

(10) Patent No.: US 10,115,152 B2  
(45) Date of Patent: Oct. 30, 2018

(54) LINE ITEM MANAGEMENT SYSTEM METHOD AND APPARATUS

(75) Inventors: Joseph A. Flynn, San Jose, CA (US); Wassim G. Jraige, Cupertino, CA (US)

(73) Assignee: Lavante, Inc., San Jose, CA (US)

( * ) Notice: Subject to any disclaimer, the term of this patent is extended or adjusted under 35 U.S.C. 154(b) by 2215 days.

(21) Appl. No.: 10/833,495

(22) Filed: Apr. 27, 2004

(65) Prior Publication Data

US 2005/0240425 A1    Oct. 27, 2005

(51) Int. Cl.  
*G06Q 30/00* (2012.01)  
*G06Q 40/00* (2012.01)

(52) U.S. Cl.  
CPC .............. *G06Q 40/00* (2013.01); *G06Q 40/12* (2013.12)

(58) Field of Classification Search  
USPC ........................................................ 705/7, 14  
See application file for complete search history.

(56) References Cited

U.S. PATENT DOCUMENTS

| | | | | |
|---|---|---|---|---|
| 5,305,200 A * | 4/1994 | Hartheimer et al. | ........... | 705/37 |
| 7,120,649 B2 * | 10/2006 | Goldfarb | ................ | G06Q 10/10 707/674 |
| 7,908,188 B2 * | 3/2011 | Flynn | ..................... | G06Q 20/10 705/30 |
| 2002/0010664 A1 * | 1/2002 | Rabideau | ............ | G06F 11/0775 705/30 |
| 2002/0040337 A1 * | 4/2002 | Kikuchi | ................. | G06Q 10/06 705/36 R |
| 2002/0077972 A1 * | 6/2002 | Wilwerding | ........... | G06Q 20/10 705/39 |
| 2002/0107794 A1 * | 8/2002 | Furphy | .............. | G06Q 10/0875 705/40 |
| 2003/0149645 A1 * | 8/2003 | Flynn | ..................... | G06Q 20/10 705/30 |
| 2004/0143502 A1 * | 7/2004 | McClung, III | ......... | G06Q 30/02 705/14.1 |
| 2004/0158510 A1 * | 8/2004 | Fisher | .................. | G06Q 20/102 705/30 |
| 2005/0031103 A1 * | 2/2005 | Gunderman, Jr. | .... | H04M 15/00 379/114.03 |
| 2005/0044015 A1 * | 2/2005 | Bracken | ................ | G06Q 20/04 705/30 |

* cited by examiner

*Primary Examiner* — Talia F Crawley  
(74) *Attorney, Agent, or Firm* — Glenn Patent Group c/o Perkins Coie LLP

(57) ABSTRACT

A method and apparatus to manage accounts auditing data. Embodiments of the invention correlate and apply credits from one vendor account with other related-entity (or "family" entity) vendor accounts, automatically recovering credits through the marshalling of line-items with related-entity vendors.

59 Claims, 13 Drawing Sheets

US 10,115,152 B2

LINE ITEM MANAGEMENT SYSTEM METHOD AND APPARATUS

BACKGROUND

Field of the Invention

Aspects of the present invention relate in general to recovery auditing, and an apparatus, and method of managing accounts auditing data.

BACKGROUND OF THE INVENTION

The practice of performing recovery audits originated in the early 1970's, during a time of increased commerce for the retail industry. A growing network of national chain stores led to a rise in competition for retail shelf space from different suppliers. Large companies had a difficult time keeping track of the many different vendor price points, rebates, and other various discounts.

Keeping track of such details was not an integral part of purchasing departments. Such oversights led to a substantial amount of lost revenue going unnoticed in the form of duplicate payments, overpayments, missed shipments, unused credits, and other transactional errors between a company and its suppliers.

Accounts Payable Audit

Today, in a typical accounts payable (A/P) audit, auditors work with the A/P records of a company in an attempt to find potentially profitable discrepancies in a vendor transaction file for the company or individual business units of the company. Although much of an A/P audit can be performed at a third party location, the A/P audit generally requires the cooperation and time of individuals within the client-organization to work in conjunction with the auditors. The A/P audit is a useful tool but can be time consuming for the client. However, typical A/P auditing firms are unable to do a thorough job of reviewing vendor data.

Statement Audit (SA)

Another type of audit emerging within the auditing industry is a statement audit. A statement audit is initiated from the vendors' records and, thus, requires little, if any, intrusion within the client-company. Once vendor files are secured, the auditing company begins the process of searching for gaps, differences, and discrepancies that result in the client-company losing revenue.

A statement audit deals directly with suppliers and vendors. However, if performed properly, a statement audit yields findings that an A/P audit could miss. Because of the unique nature of a statement audit, the statement audit can either stand alone or function alongside typical A/P recovery efforts. A statement audit is very labor intensive because the statement audit requires multiple attempts at requesting, receiving, organizing, and following up with vendors on auditing data from many sources. In some statement audits, the number of sources ranges in the tens of thousands of sources. Due to the labor intensive demands of a statement audit, very few A/P auditing firms in the A/P auditing industry, if any, have the capability of doing a thorough and complete job for their clients.

Prior art statement audits fail to manage credits based on line item data or on a line item basis. Instead, prior art statement audits attempt to manage credits based only on statement level data, which is not as detailed as line item data. Prior art statement audits put a reference to each statement in a file, electronic or manual, and then record a note for each open line item indicating that the open line item should be checked at some point in the future. In addition, prior art statement audits only keep track of claims. Prior art statement audits fail to keep track of every line item of a client.

Transactional Errors

There is no accepted way to predict the success of an audit. However, a general rule of thumb is that transactional errors occur with a frequency of about 1/10 of 1%. That translates to a million dollars of annual recovery for every billion dollars of a company's annual revenue.

The A/P auditing industry is growing in size and stature as third party A/P auditing firms attempt to recover lost profits for their clients. However, since A/P auditing firms are unable to do a thorough job of reviewing vendor data, clients have employed internal auditors in order to recover lost profits via a statement audit. However, clients typically are unable to perform statement audits because they do not have the amount of staff necessary to perform a statement audit.

DETAILED DESCRIPTION

What is needed is an easy-to-use apparatus and method capable of that manages a client's accounts auditing data.

Aspects of the present invention include an easy-to-use apparatus, method, and a web-enabled interface capable of managing accounts auditing data. One aspect of the invention is the correlation and application of credits from one vendor account with other related-entity vendor accounts. Another aspect of the invention is the integration and automatic recovery of credits through the marshalling of line-items with related-entity (or "family" entity) vendors.

For the purposes of this application, "clients" are any company, business, organization, person, or other entity that is having its account information being audited.

Vendors are any customer, company, business, organization, person, or other entity that have a business relationship with a client.

Discrepancies are any credits, debits, and/or any accounting anomalies, as are known in the art.

Embodiments of the present invention include an apparatus, method and system of client-organization that manage open line items that become held up in active accounting ledgers. An audit server tracks line items from their generation until their resolution. A resolution comes when a line item can be appropriately accounted for and is removed from any active accounting ledger. The ability to resolve open line items will provide a great source of profit recovery, a significant addition to cash flow, and an effective tool to rectify accounting discrepancies. In many cases line items may get held up in active accounting ledgers and halt any progression toward a resolution. As described herein, the audit server helps clients keep better controls on line items that get held up in accounting queues.

Figure 1:
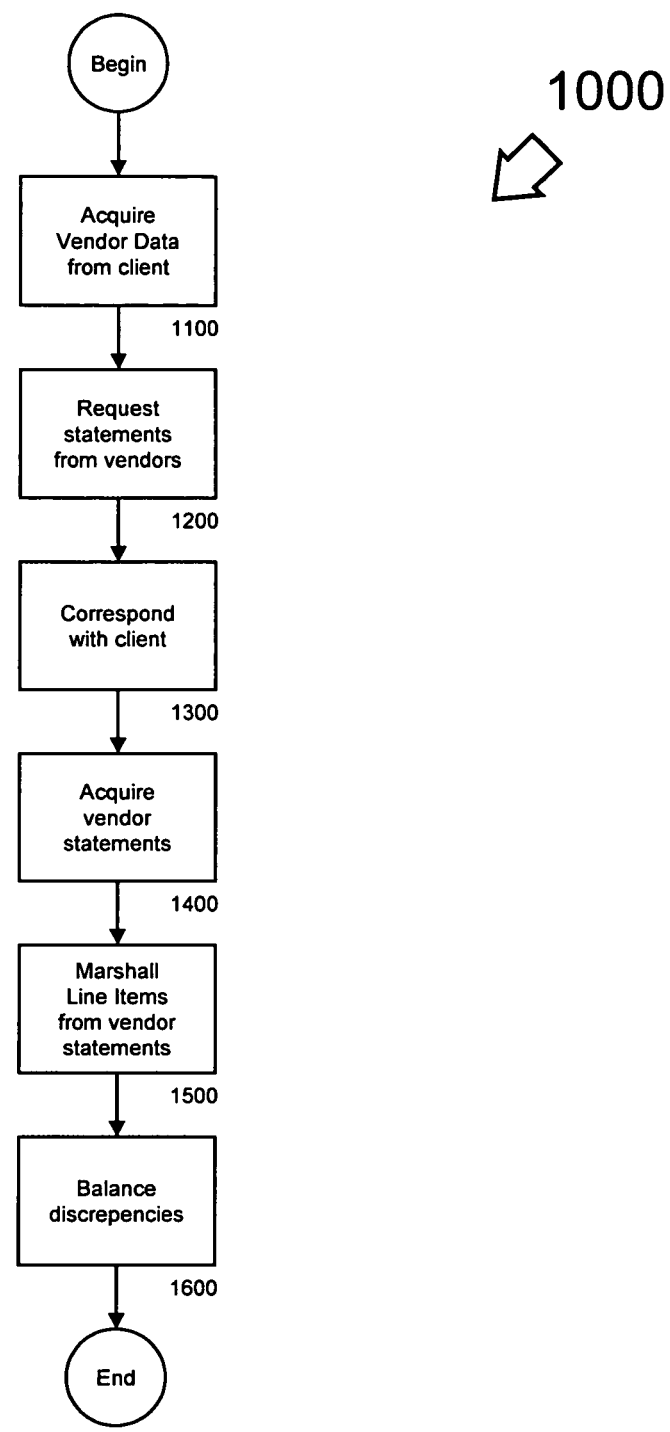
FIG. 1 illustrates an embodiment of a system that manages accounts auditing data.

FIG. 1 flowcharts a process 1000 to manage accounts auditing data, constructed and operative in accordance with an embodiment of the present invention. In this method embodiment, vendor contact data is acquired from the client, act 1100. From the client-organization point of view, the line item management system (LIMS) 300 is fueled by customer and vendor information. To compile information for input into the audit database 308, customers and vendors will be contacted by mail, electronic mail, facsimile, or phone. The initial contact will be sent in document form requesting a listing of pertinent line items that a client will be interested in sorting through for the purposes of maximizing company cash flow. The document will have space for vendors and/or customers to update contact information for the client-organizations databases. Additionally, the document states that the request is of an internal origin and not the effort of an external firm. Vendors and/or customers will be encouraged to deliver all future statements to the provided numbers and addresses. Using the vendor contact data, process 1000 requests that the vendors provide financial statements related to their interactions with the client, act 1200. At act 1300, process 100 corresponds with the client, and acquires vendor statements at act 1400. The vendor statements are examined and line items are marshaled at act 1500. Any discrepancies found are applied at act 1600. The sub-processes 1100-1600 will be described in greater detail below.

Figure 2:
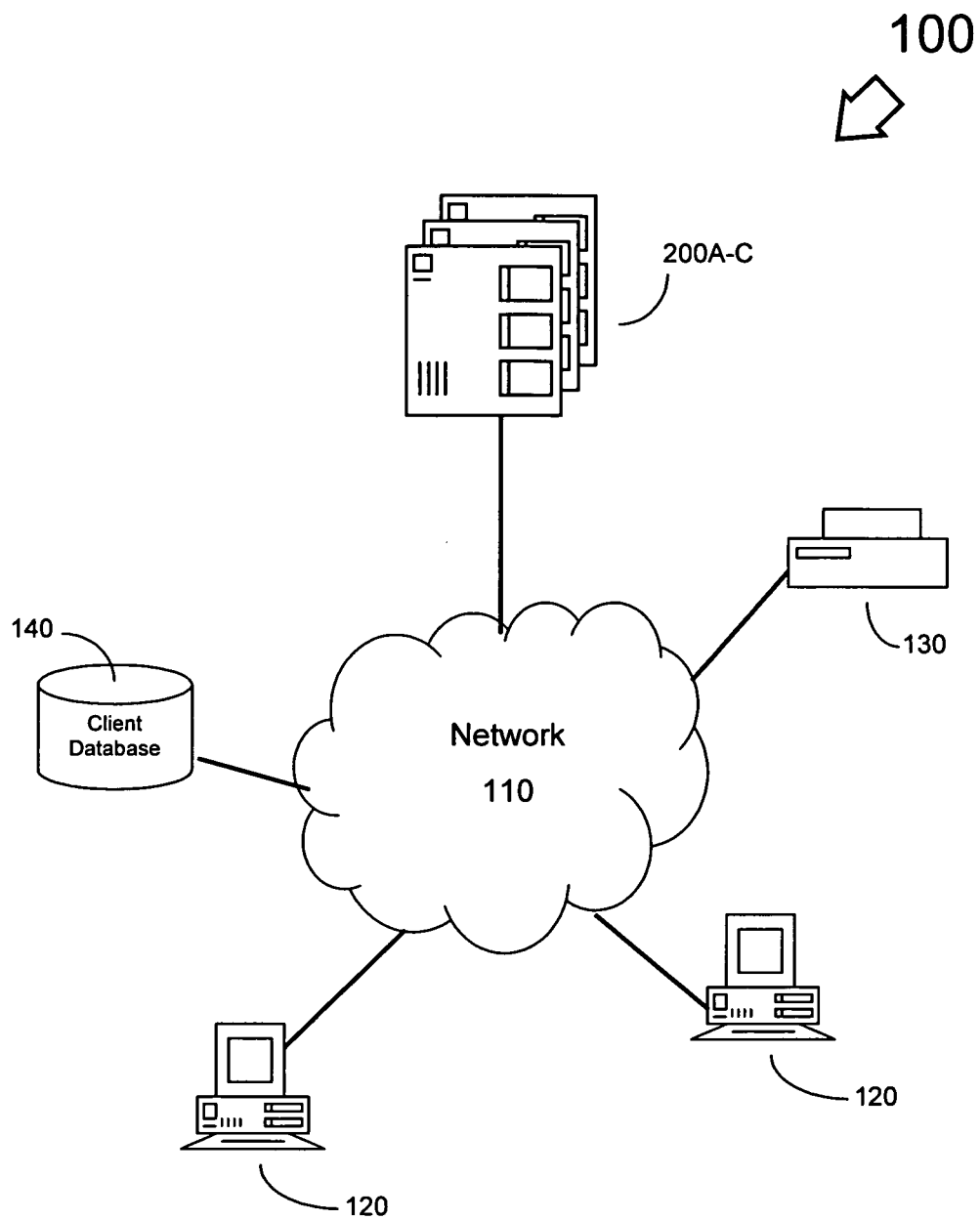
FIG. 2 is an act diagram of an apparatus that manages accounts auditing data.

FIG. 2 is a simplified functional diagram depicting system 100, constructed and operative in accordance with an embodiment of the present invention. System 100 is configured to manacle accounts auditing data.

Unlike third party recovery audits, the embodiments described herein are an automated system that enable clients to use the extensive knowledge of their internal systems and their vendor population during the recovery process without costing valuable time.

In system 100, client computers 120 are connected via a communications network 110 to audit servers 200A-C. At the outset of system 100, clients computers 120 establish a link to the line item detail within their accounting system to audit server 200. From this link, "web services" and "database views" can read and compare fields as a method of preventing overlap between internal data and audit data. During a reporting process, audit server 200 can compare and contrast internal client data and audit data for inclusion or separation on management reports. Unlike conventional third party recovery audits, the audit server 200 may be part of an automated system 100 that enables client's to use the extensive knowledge of their internal systems and their vendor population during the recovery process without costing valuable time.

In some embodiments, audit server 200 may be a personal computer, mini-computer, mainframe, or other such network-computing device.

The network 110 may also include other networkable devices known in the art, such as other client computers 120, printers 130, and/or client database 140. A client database 140 may be any database known in the art that contains customer or vendor information, such as address, billing, or other transactional information about customers or vendors.

Network 110 may be any communication network known in the art, including the Internet, a local-area-network (LAN), a wide-area-network (WAN), or any system that links a computer to an audit server 200 Further, network 110 may be of configured in accordance with any topology known in the art, including star, ring, bus, or any combination thereof. Furthermore, it is well understood in the art, that any number or variety of computer networkable devices or components may be coupled to the network 110 without inventive faculty. Examples of other devices include, but are not limited to, servers, computers, workstations, terminals, input devices, output devices, printers, plotters, routers, bridges, cameras, sensors, or any other such device known in the art.

Figure 3:
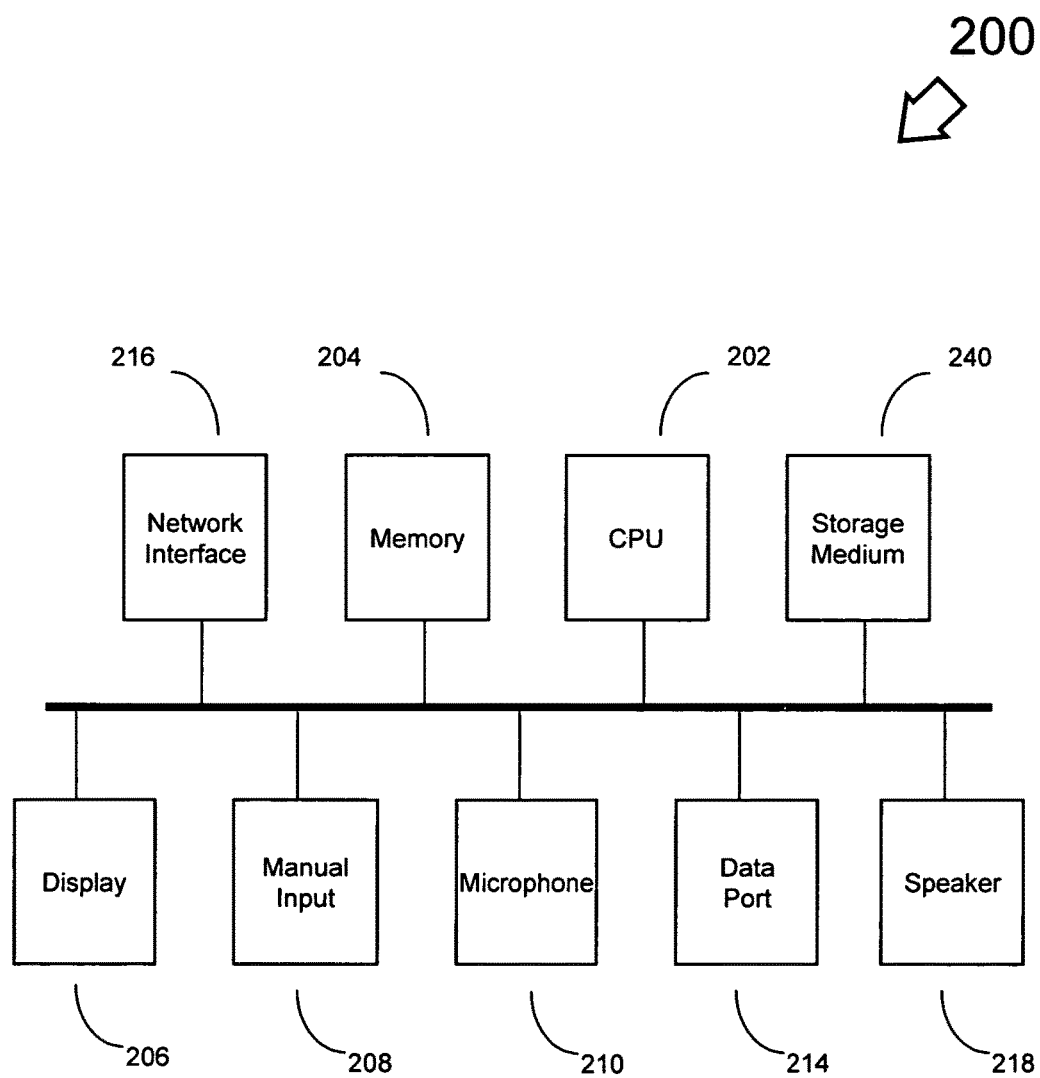
FIG. 3 is an act diagram of an apparatus that manages accounts auditing data.

Embodiments will now be disclosed with reference to a functional act diagram of an exemplary audit server 200 of FIG. 3, constructed and operative in accordance with an embodiment of the present invention. Audit server 200 may run a real-time multi-tasking operating system and includes at least one processor or central processing unit (CPU) 202. Processor 202 may be any microprocessor or micro-controller as is known in the art.

The software for programming the processor 202 may be found at a computer-readable storage medium 240 or, alternatively, from another location across network 110. Processor 202 is connected to computer memory 204. Audit server 200 may be controlled by an operating system (OS) that is executed within computer memory 204.

Processor 202 communicates with a plurality of peripheral equipment, including network interface 216. Additional peripheral equipment may include a display 206, manual input device 208, storage medium 240, microphone 210, and data port 214.

Display 206 may be a visual display such as a cathode ray tube (CRT) monitor, a liquid crystal display (LCD) screen, flat-panel display, touch-sensitive screen, or other monitors as are known in the art for visually displaying images and text to a user.

Manual input device 208 may be a conventional keyboard, keypad, mouse, trackball, or other input device as is known in the art for the manual input of data.

Storage medium 240 may be a conventional read/write memory such as a magnetic disk drive, floppy disk drive, compact-disk read-only-memory (CD-ROM) drive, digital versatile disk (DVD) drive, flash memory, memory stick, transistor-based memory or other computer-readable memory device as is known in the art for storing and retrieving data. Significantly, storage medium 240 may be remotely located from processor 202, and be connected to processor 202 via a network 110 such as a local area network (LAN), a wide area network (WAN), or the Internet.

Microphone 210 may be any suitable microphone as is known in the art for providing audio signals to processor 202. In addition, a speaker 218 may be attached for reproducing audio signals from processor 202. Video input 122 may be a digital or analog video camera device to record still or moving images. It is understood that microphone 210, speaker 218, and data port 214 may include appropriate digital-to-analog and analog-to-digital conversion circuitry as appropriate.

Data port 214 may be any data port as is known in the art for interfacing with an external accessory using a data protocol such as RS-232, Universal Serial Bus (USB), or Institute of Electrical and Electronics Engineers (IEEE) Standard No. 1394 ('Firewire'). In some embodiments, data port 214 may be any interface as known in the art for communicating or transferring files across a computer network, examples of such networks include Transmission Control Protocol/Internet Protocol (TCP/IP), Ethernet, Fiber Distributed Data Interface (FDDI), token bus, or token ring networks. In addition, on some systems, data port 214 may consist of a modem connected to network interface 216. Similarly, in some embodiments network interface 216 provides connectivity to audit server 200 to communicate with a network 110. Thus, the network interface 216 allows the audit server 200 to communicate and process input and output from a telephone line.

Figure 4:
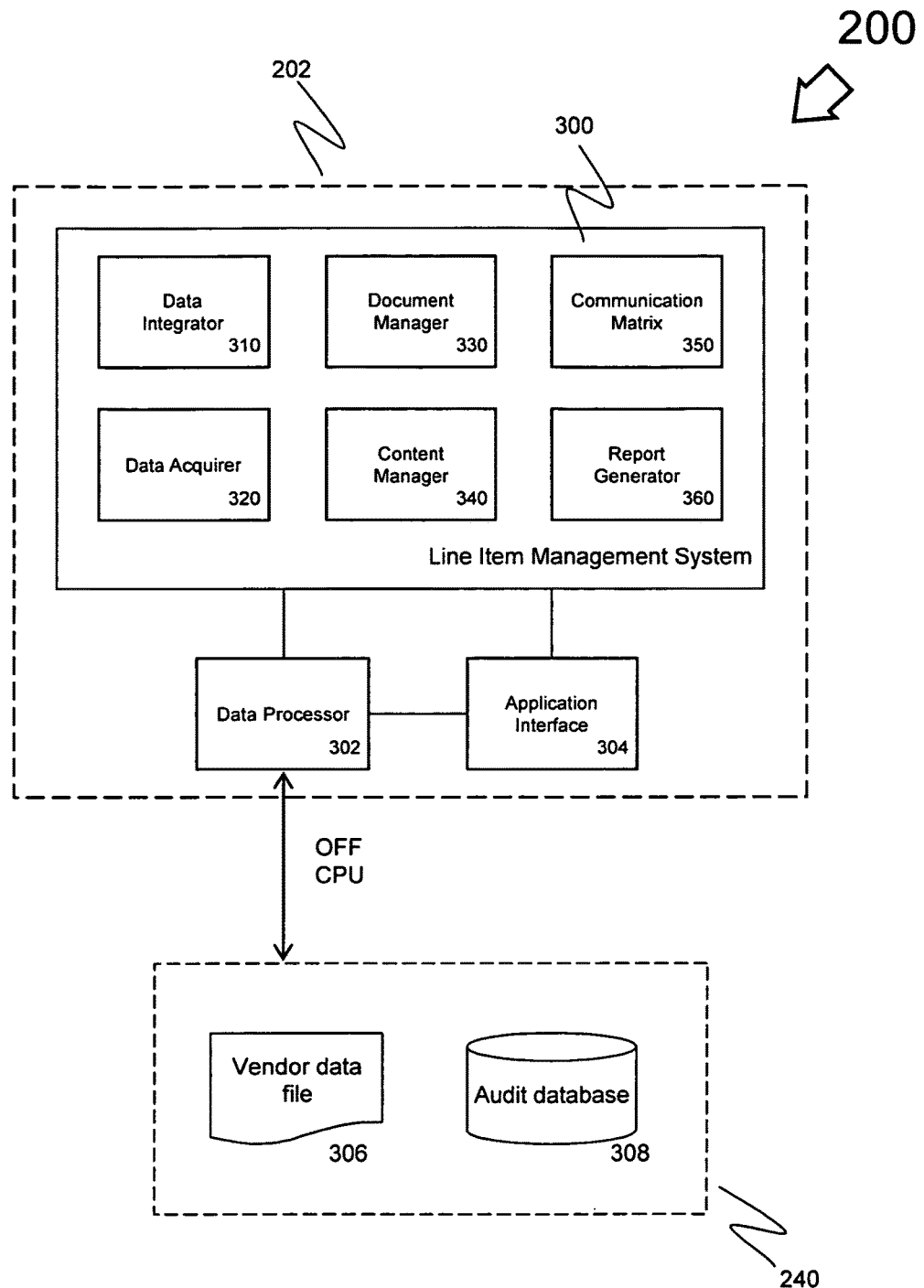
FIG. 4 is a flow chart of a method to manage accounts auditing data.

FIG. 4 is an expanded functional act diagram of CPU 202 and storage medium 240. It is well understood by those in the art, that the functional elements of FIG. 4 may be implemented in hardware, firmware, or as software instructions and data encoded on a computer-readable storage medium 240. As shown in FIG. 4, central processing unit 202 is functionally comprised of a line item management system 300, data processor 302, and an application interface 304. Line item management system may further comprise: data integrator 310, data acquirer 320, document manager 330, content manager 340, communication matrix 350, and report generator 360. These structures may be implemented as hardware, firmware, or software encoded on a computer readable medium, such as storage media 240. In addition, as shown in FIG. 4, storage media 240 may also contain vendor data file 306, and a caller database 244. The function of these structures may best be understood with respect to the flowchart of FIGS. 5-10, as described below.

Data processor 302 interfaces with display 206, manual input device 208, storage medium 240, microphone 210, data port 214, and network interface 216. The data processor 302 enables processor 202 to locate data on, read data from, and write data to, these components.

Application interface 304 enables processor 202 to take some action with respect to a separate software application or entity. For example, application interface 304 may take the form of a windowing call recipient interface, as is commonly known in the art.

Line item management system 300 is a window-interface audit management system. In some embodiments, the line item management system 300 may be stand-alone program, or a web-browser window.

Figure 5:
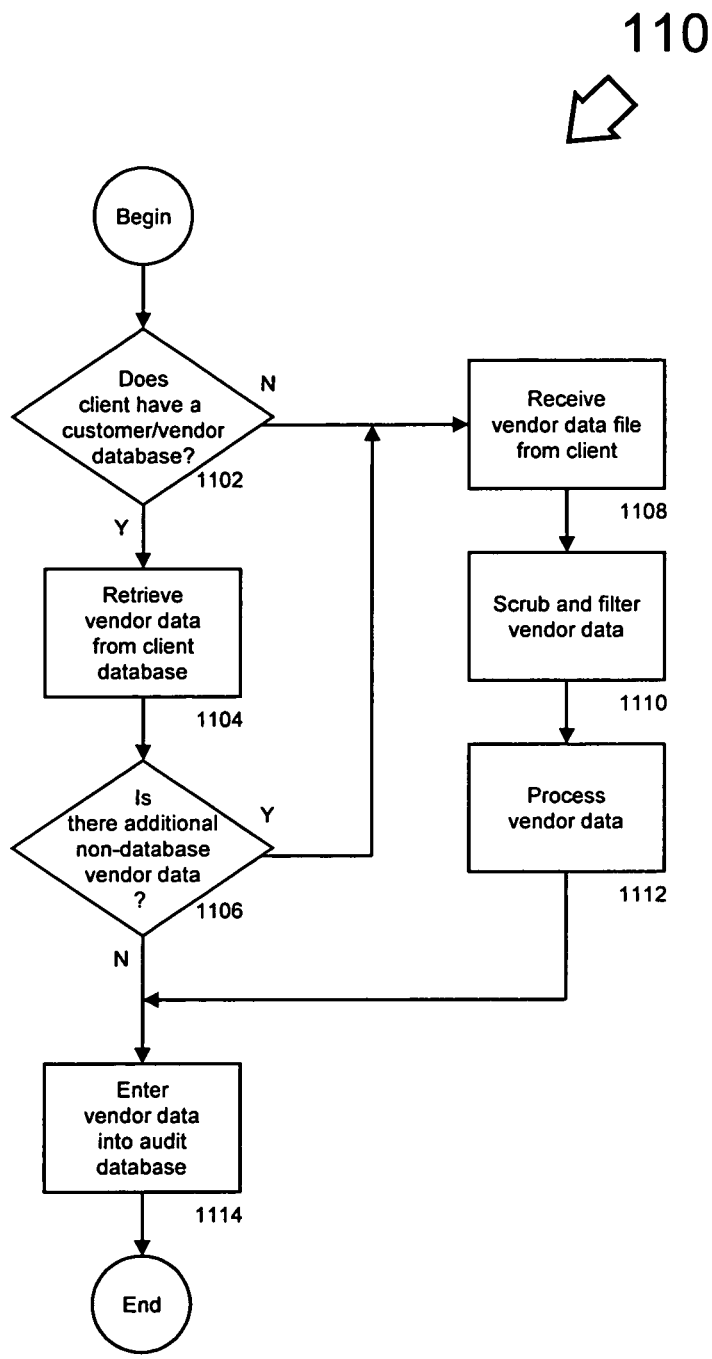
FIG. 5 is a flow chart of a method of acquiring vendor data to manage accounts auditing data.

FIG. 5 flowcharts sub-process 1100, a method of acquiring vendor data to manage accounts auditing data, constructed and operative in accordance with an embodiment of the present invention. It is understood that the method discussed herein may be implemented in relationship to a number of different methodologies, including methods that are fully automated, semi-automated, manual, or combinations thereof. In an automated or semi-automated environment, data integrator 310 and data acquirer 320 may act together to retrieve and integrate vendor information from a client database 140 or vendor file 306 into an audit database 308.

At act 1102, a determination is made on whether the client being audited has a client database 140, sometimes also known as customer/vendor database 140. In some embodiments, data acquirer 320 determines if audit server 200 is able to access client database 140. If the client database 140 is accessible, flow continues at act 1104, where vendor data is retrieved from the client database 140. In such embodiments, data acquirer 320 may also comprise translation filters to allow importation of data in alternate database formats, as is known in the art. If there is additional non-database vendor data, as determined at act 1106, flow continues at act 1108. If no additional vendor data is available, flow continues at act 1114.

If a client database 140 is not available, as determined at act 1102, flow continues at act 1108.

At act 1108, a vendor data file 306 is received from the client. When a client database is not available to audit server 200, or additional non-database vendor data is available, a vendor's contact information may be retrieved through client records, such as a vendor data file 306. Vendor data files 306 may be any comprise any form of data, which contains the address or other contact information for a vendor. For example, vendor files may include address book information (in either electronic or hardcopy formats), or even physical statements for/to a vendor, as long as the address or other contact information is available.

In the event that the vendor data file 306 is not initially available in an electronic format, the data vendor file 306 is scrubbed and filtered, act 1110. The vendor data is then processed, act 1112, into a format that readable by the line item management system 300.

At act 1114, the vendor data is entered into the audit database 308, and sub-process 1100 ends.

Figure 6A:
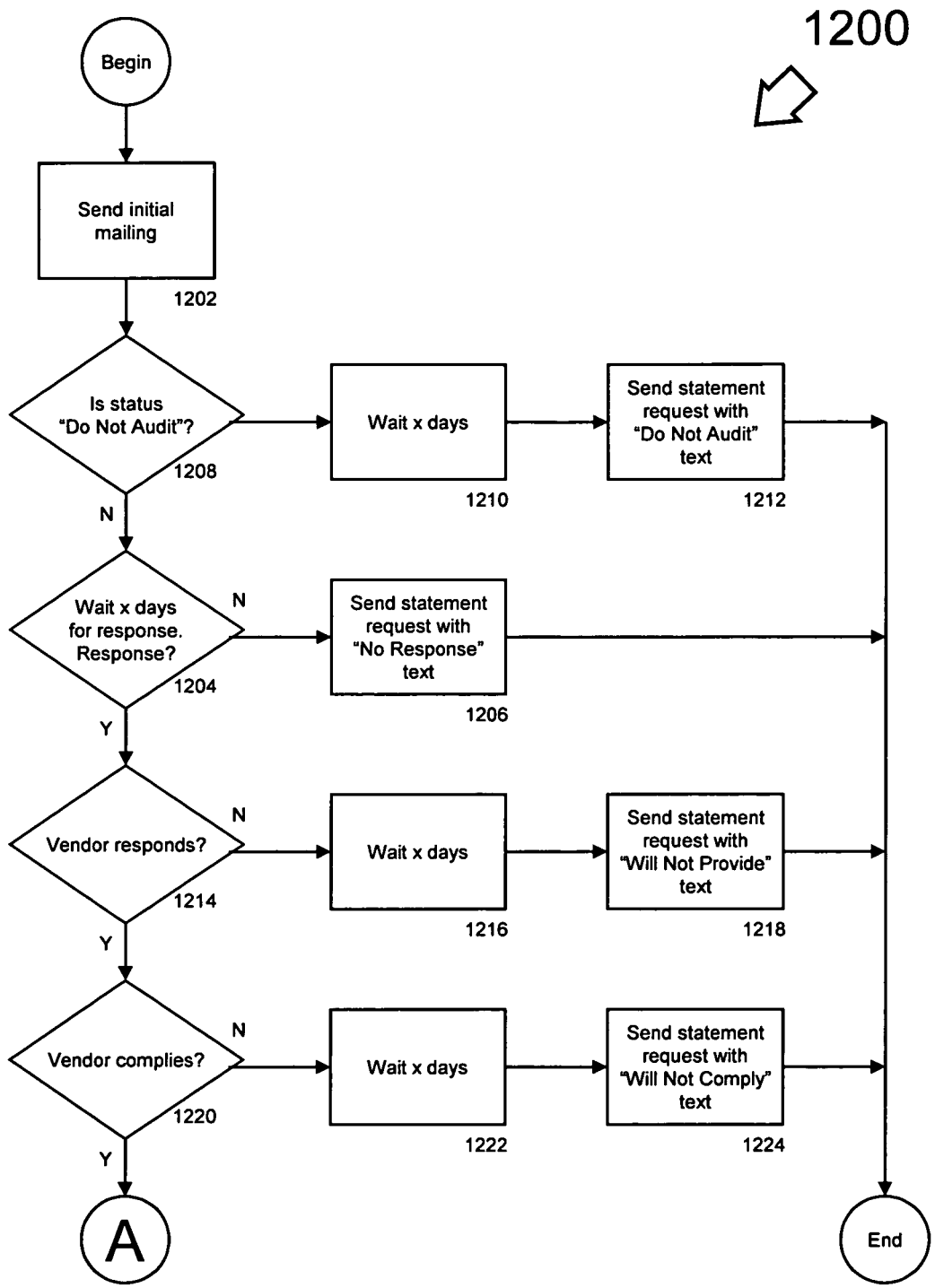
FIGS. 6A-B are a flow chart of a method of requesting statements from vendors to manage accounts auditing data.
Figure 6B:
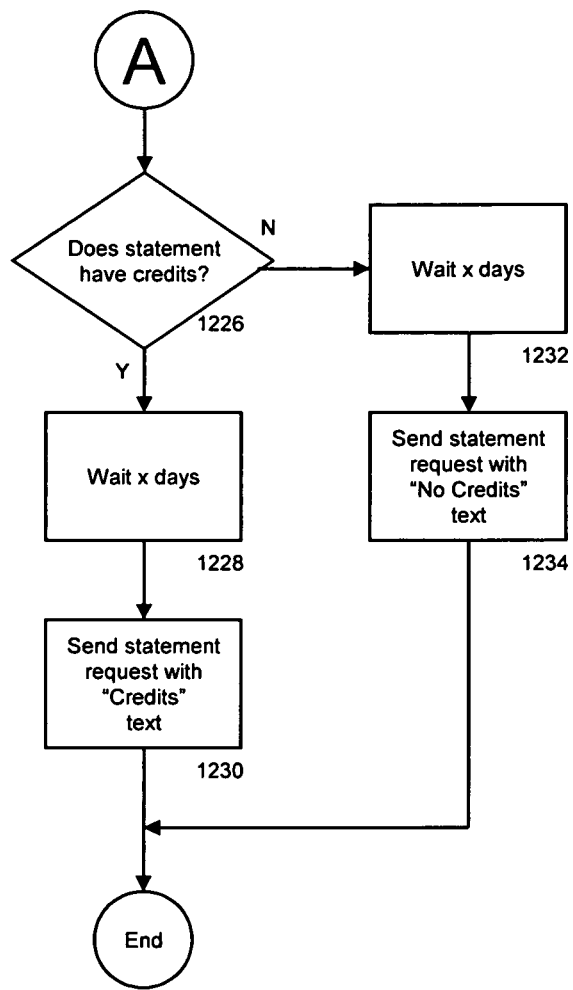

Moving on to FIG. 6A-B, sub-process 1200 requests statements from vendors to manage accounts auditing data, constructed and operative in accordance with an embodiment of the present invention. Now that sub-process 1100 has retrieved the vendor contact information, sub-process 1200 facilitates contact with vendors to obtain audit information, such as vendor statements. It is understood that sub-process 1200 may be fully automated, semi-automated, manual, or combinations thereof.

At act 1202, document manager 330 sends each vendor an initial mailing to request copies of statements documenting their sales transactions with the client being audited.

When the vendor is a known entity should not be audited (at a client's discretion, for example), their status may be preset as "do not audit." If this is the case, as determined by act 1208, sub process 1200 waits the predetermined number of days, act 1210, before document manager 330 sends a statement request with text tailored to vendors that "do not audit," act 1212. In such cases, the wait at act 1210 interval may be months or even years. The process flow then ends, pending another response from the vendor.

At decision act 1204, sub-process 1204 waits a predetermined number of days for a response. At a client's discretion, the predetermined number of days (x days) may vary from a single day to a number of weeks. The users of audit server 200 may adjust the number of days according to the urgency of the anticipated reply to the type of courier service used to mail/transmit the letter. For example, if a longer response time may be allotted for mail across the country than a facsimile transmission to someone in the same city. It is worth noting that various vendors may have different predetermined waiting periods. Although at various points throughout the example method embodiments predetermined wait times are mentioned, these predetermined wait times may differ from embodiment to embodiment, and may differ from each other. If the vendor does not respond, as determined by act 1204, a letter is sent with a "no response text," reminding the vendor to respond, act 1206, and the process flow ends, pending another response from the vendor.

When the vendor responds, as determined by act 1204, their response is analyzed to determine the audit server's next action.

If the vendor is not responsive, as determined by act 1214, sub process 1200 waits a predetermined number of days, act 1216, and document manager 330 sends a statement request with text tailored to vendors that "will not provide," act 1218. The process flow then ends, pending another response from the vendor.

When the vendor responds, as determined by act 1214, the response is analyzed to determine the response complies with the audit request. If the answer does not comply, as determined by act 1220, sub process 1200 waits the predetermined number of days, act 1222. Document manager 330 sends a statement request with text tailored to vendors that "will not comply," act 1224. The process flow then ends, pending another response from the vendor. If the vendor's answer is responsive, the vendor statement is analyzed for credits. If the statement has credits, as determined at act 1226, sub process 1200 waits the predetermined number of days, act 1228, and document manager 330 sends a statement request with an appropriate "credits" text, act 1230. If the statement has no credits, sub process 1200 waits a predetermined number of days, act 1232, before document manager 330 sends a statement request with an appropriate "no credits" text, act 1234. Sub process 1200 then ends.

Figure 7:
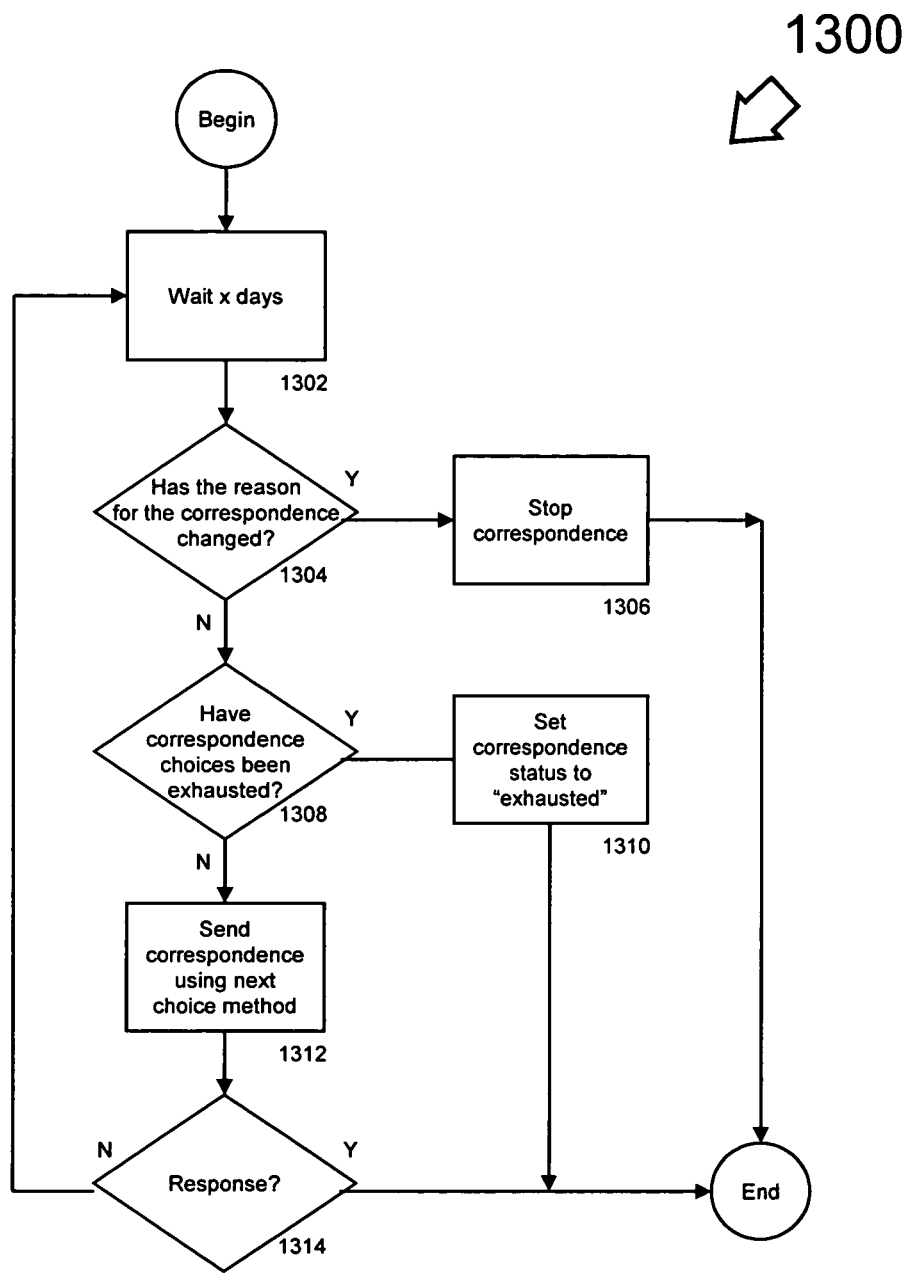
FIG. 7 is a flow chart of a method of corresponding with clients and/or vendors to manage accounts auditing data.

FIG. 7 is a flow chart of a method of corresponding with clients and/or vendors to manage accounts auditing data, constructed and operative in accordance with an embodiment of the present invention. Sub-process 1300 illustrates an embodiment that coordinates correspondence with vendors and/or clients. For example, sub-process 1300 may be used in conjunction with the correspondence/statement-sending in sub-process 1200. It is understood that sub-process 1300 may be fully automated, semi-automated, manual, or combinations thereof. Embodiments of communication matrix 350 may use sub-process 1300.

Communication matrix 350 generates and automatically sends documents by the client-organization to the appropriate party, initiating communications. The audit server keeps 200 track of all historical activity and can recover any outgoing and incoming correspondence, and keeps a running account of communications, storing the communication in the audit database 308. In some embodiments, hardcopy correspondence may be digitized for storage in audit database 308.

The audit server 200 may use a variety of different correspondence methods. For example, an initial correspondence may be via mail, with follow-up reminder correspondence being mail, electronic mail, facsimile (FAX), phone, courier, overnight delivery, or any other communication method known in the art.

Initially, at act 1302, communication matrix 350 waits a predetermined number of days. As stated above, the predetermined number of days (x days) may vary from a single day to a number of weeks. Audit server users may adjust the number of days according to the urgency of the anticipated reply to the type of courier service used to mail/transmit the communication. After the initial waiting period, a determination is made on whether the reason for the correspondence has changed, act 1304. For example, a reply from a vendor may change the correspondence reason. If the reason has changed, the correspondence is stopped, at act 1306, and sub-process 1300 ends.

If the reason for the correspondence has not changed, communication matrix 350 determines whether all the correspondence choices have been exhausted, act 1308. If the correspondence choices have been exhausted, the correspondence status is set to "exhausted," at act 1310, and sub-process 1300 ends. If there are correspondence methods still unused, the next correspondence choice is used, act 1312.

At act 1314, the communication matrix determines whether any response to the correspondence has occurred. If there is a response, sub-process 1300 ends. If not, flow returns to act 1302.

Figure 8:
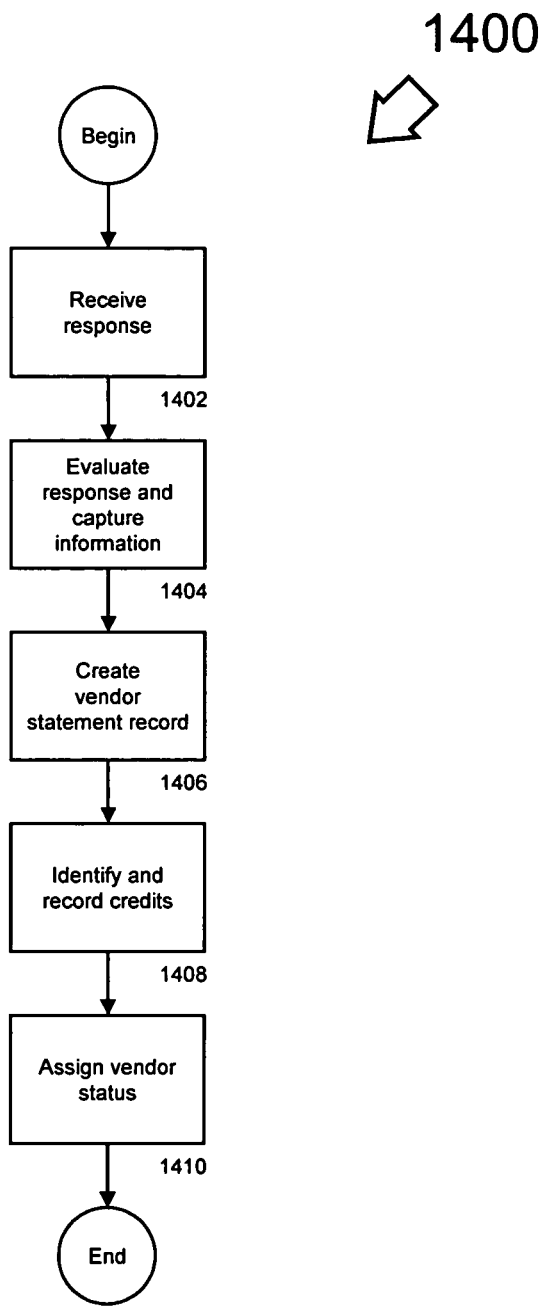
FIG. 8 is a flow chart of a method of acquiring statements from vendors to manage accounts auditing data.

FIG. 8 is a flow chart of a sub-process 1400 that acquires statements from vendors to manage account data, constructed and operative in accordance with an embodiment of the present invention. Unlike conventional third party recovery audits, the line item management server 300 generates a high level of external data for inclusion into recovery efforts. Acquiring additional data not only adds to profit recovery, but to better business insights as well. Embodiments of sub-process 1400 may be fully automated, semi-automated, manual, or combinations thereof.

Data integrator 310 receives the vendor response, act 1402. The use of optical character recognition (OCR) technology enables the line item management system 300 to identify and store the vast majority of incoming documents. All templates, when created, generate codes within the pages. When a vendor faxes or emails a response with the document as a cover sheet, the line item management system 300 evaluates the response, and captures the response information. The response information may then be used to crate a vendor statement record, act 1406, determining when and why the document was created and from which vendor or customer it was sent.

When available, credits are identified and recorded, act 1408, and a vendor status is assigned, act 1410. Vendor status is discussed in greater detail below.

Figure 9A:
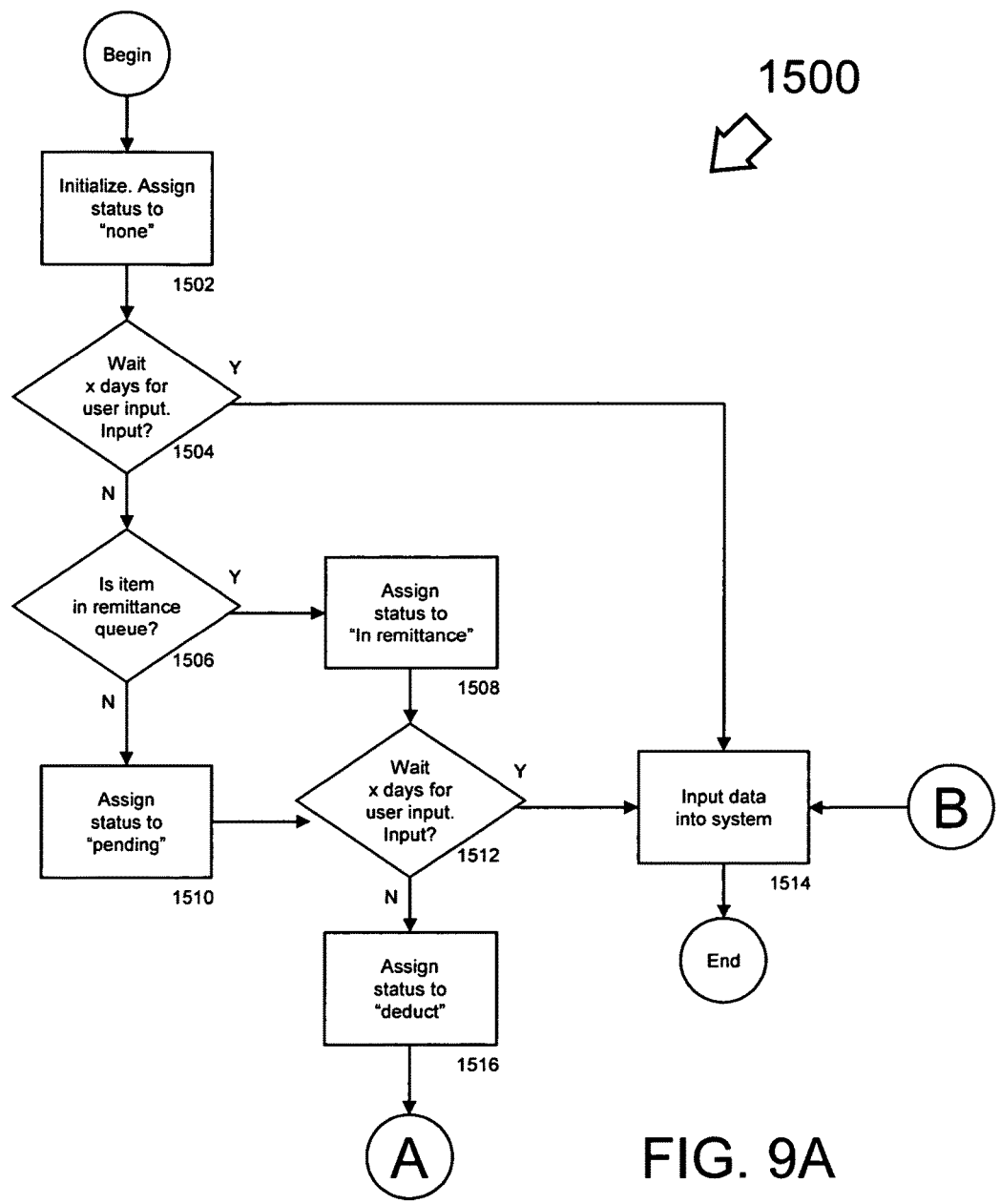
FIGS. 9A-C are a flow chart of a method of marshalling line items from vendor statements to manage accounts auditing data.
Figure 9B:
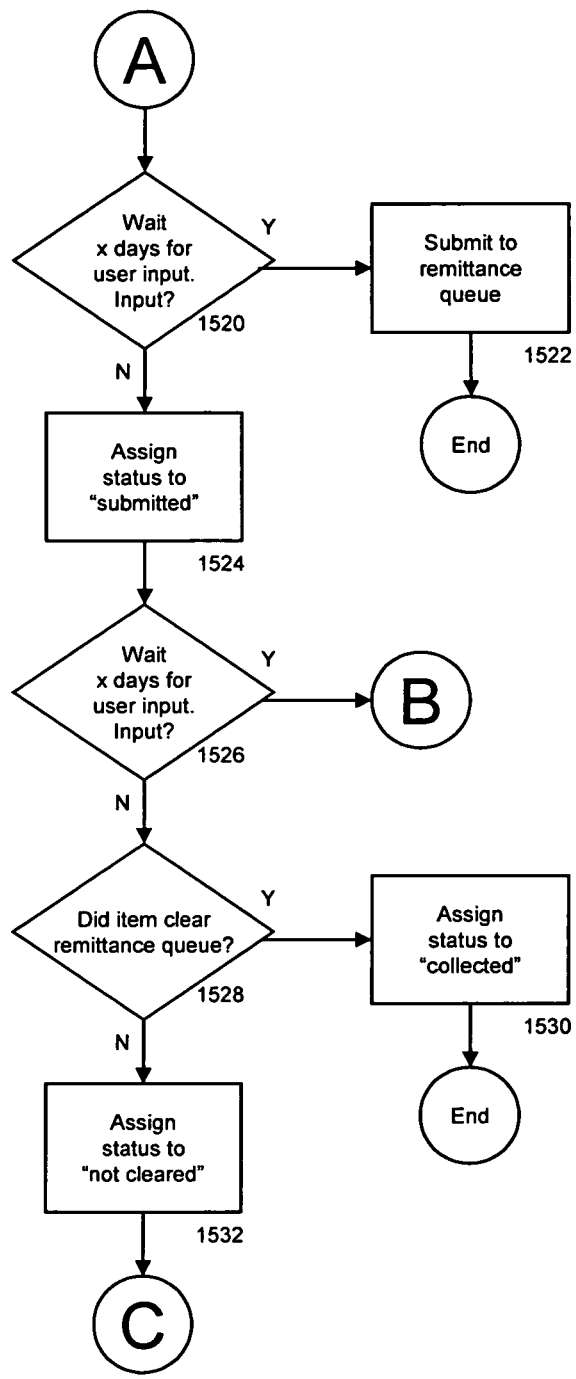
Figure 9C:
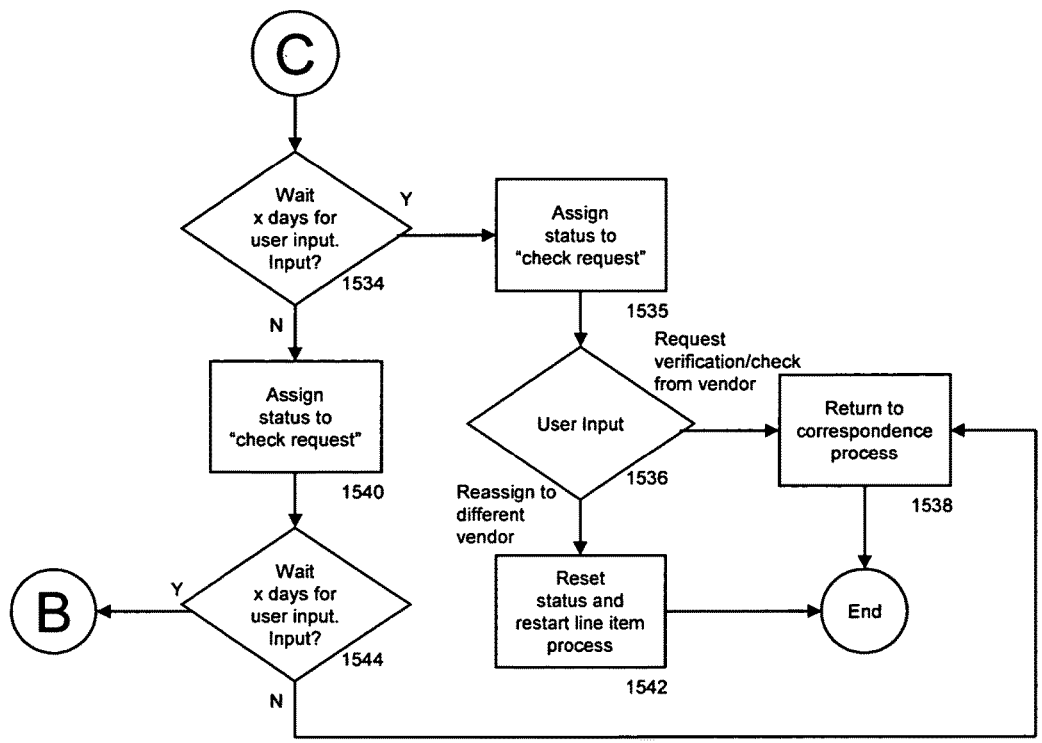

FIGS. 9A-C are a flow chart of a metho7400 of marshalling line items from vendor statements to manage accounts auditing data, constructed and operative in accordance with an embodiment of the present invention. The line item management system 300 tracks open line items from their discovery in the client system 100 as well as external sources (such as vendor and customer records) through their resolution. The time a line item spends between discovery and resolution is considered the "life" of the line item. In most cases a desired resolution will come as a credit deducted by or paid to the client organization. Throughout its life in the audit server 200, a line item will assume several different statuses. These statuses will be manipulated both manually and automatically. Most of statuses are self explanatory and may be reused throughout the various applications of the line item management system 300. In some embodiments, each change in line item status is tagged with the date and the user that made the change. This allow a client to generate detail reports on virtually every step in the resolution process.

In some embodiments, line items include several attributes. These attributes may include, but not limited to: date of statement, date of line item, dollar amount, reference number, associated division, vendor name, and vendor ID.

Initially, each vendor statement is associated with a vendor record as part of the initialization process, and the status of the record is "none," act 1502. At act 1504, the system waits a predetermined number of days for users input with regard to the vendor record; if action has been taken, the sub-process flows to act 1514, and data is input into the system, and sub-process 1500 ends. If the data has not been input, sub-process 1500 flows to act 1506.

At act 1506, a decision is made on whether the item is in the remittance queue. If so, the status is set to "in remittance," act 1508, and continues at act 1512. If not, the status is set to "pending," act 1510, and continues at act 1512.

The system 300 waits a predetermined amount of time for users input with regard to the vendor record; for example, to see if the record should be closed as a duplicate. If action has been taken, the sub-process flows to act 1514, and data is input into the system, and sub-process 1500 ends. If not, the status is set to "deduct," act 1516.

Again, the line item management system 300 waits a predetermined amount of time for users input with regard to the vendor record, act 1520; if action has been taken, the record is submit to the remittance queue, and the process ends. If no action has been taken, the vendor record is set to "submitted" status.

At act 1526, the line item management system 300 waits a predetermined amount of time for users input with regard to the vendor record; if action has been taken, the sub-process flows to act 1514, and data is input into the system, and sub-process 1500 ends. If not, decision act 1528 determines whether the vendor record has cleared the remittance queue. If so, the status is "collected, act 1530.

If the item does not clear the remittance queue, the status is assigned to "not cleared," act 1532.

At this point, the line item management system 300 attempts to recover discrepancies owed to the client. In some embodiments, discrepancies are recovered by check requests sent to the vendor. In alternate embodiments, discrepancies are recovered by deducting the discrepancy from future remittances. In other embodiments, the line item management system 300 recovers discrepancies by assigning the discrepancies to family entities, as described below in sub-process 1600. In yet other embodiments, line item management system 300 may recover discrepancies through a combination thereof. For illustrative purposes only, sub-process 1500 performs a debit recovery through check requests. The line item management system 300 waits another predetermined amount of time for users input with regard to the vendor record, act 1534. If input at act 1534, the status is assigned to "check request," act 1535. A user response is requested on whether to request verification from the vendor or reassign the line item to a different vendor, act 1536. If the line item is reassigned to a different vendor, the status is reset, and the line item process is restarted, act 1542. If verification is requested from the vendor, the line item management system 300 returns to the correspondence sub-process, act 1538. If not input has been determined at act 1534, the status is assigned to "check request," act 1540.

At act 1544, the line item management system 300 again waits a predetermined amount of time for users input with regard to the vendor record; if action has been taken, the sub-process flows to act 1514, and data is input into the system, and sub-process 1500 ends. If not, the system 300 returns to the correspondence process 1538.

Figure 10:
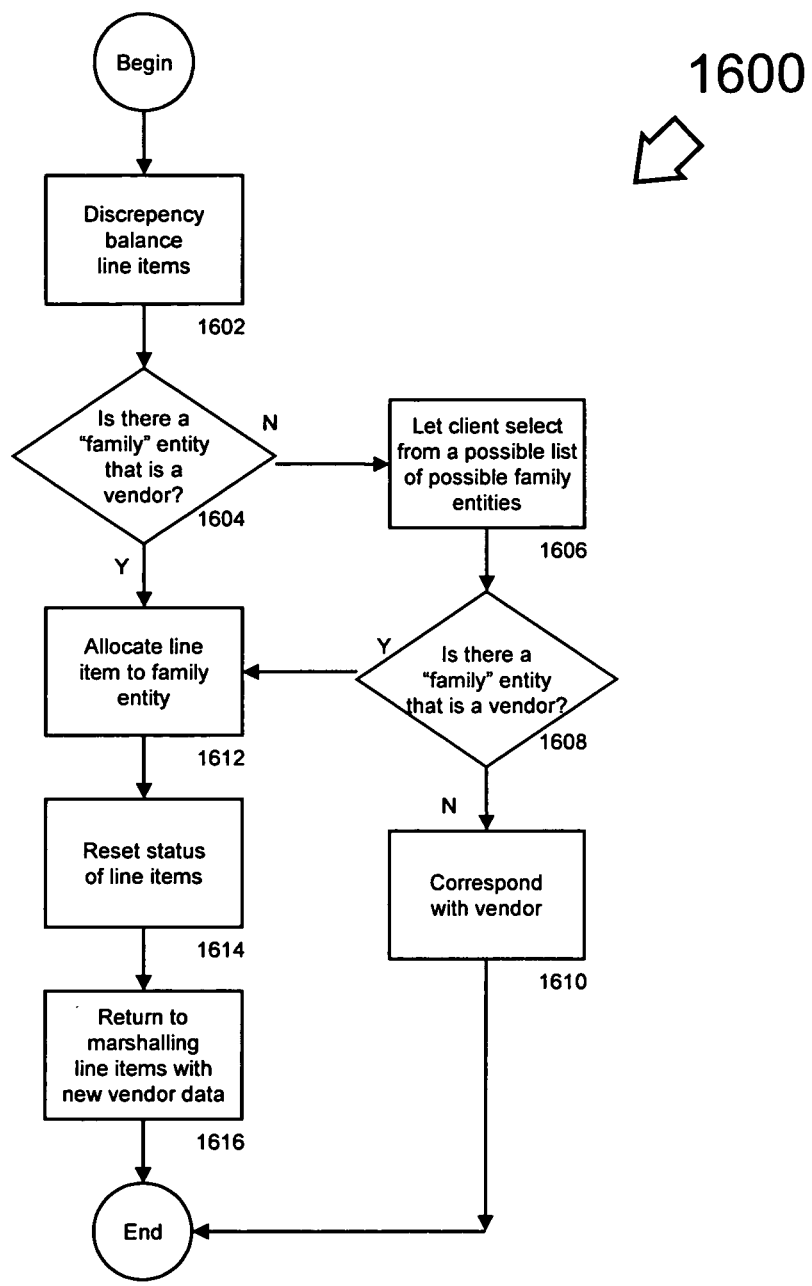
FIG. 10 is a flow chart of a method of balancing discrepancies to manage accounts auditing data.

FIG. 10 is a flow chart of a sub-process 1600 of balancing discrepancies to manage accounts auditing data, constructed and operative in accordance with an embodiment of the present invention.

At act 1602, the line items are debit balanced. The line item management system 300 determines whether there is another vendor is a "family" or related business entity. If not, the client is prompted to select a possible family entity from a list of probable family entities, act 1606. In some embodiments, line item management system 300 offers a selection based upon the activity level of the family entity. If there is no family entity that is a vendor, at decision act 1608, the line item management system corresponds with the original vendor, act 1610. If there is a family entity vendor, the debit is allocated to the family entity, act 1612. As described above, discrepancies may be recovered in a variety of ways, including, but not limited to: deducting the discrepancy from a check remittance, check requests sent to the vendor, assigning the discrepancies to family entities, obtaining merchandise from the vendor, or any combination thereof.

The status of the line items is reset, act 1614, and the system 300 returns to marshalling line items with the new vendor, act 1616.

The previous description of the embodiments is provided to enable any person skilled in the art to practice the invention. The various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein.

What is claimed is:

1. An apparatus for performing electronic audits of vendor records, comprising:
   a data acquirer, implemented in a processor, configured to automatically acquire vendor data from a database in response to making a determination that an audit is to be performed, wherein the vendor data includes vendor contact information associated with a vendor that performs business transactions with a client,
   wherein the data acquirer includes at least one translation filter that automatically converts alternate database formats into a compatible database format in response to making a determination that the vendor data has been imported from the database in the alternate database formats;
   a communication matrix, implemented in the processor, configured to send an audit request to the vendor upon receiving the vendor data from the data acquirer, wherein said audit comprises an examination and verification of accounts and records related to said business transactions that includes reviewing disbursement transactions and related supporting data to identify and recover overpayments and under-deductions to said vendor, and wherein said audit identifies transactions among said business transactions that comprise open line items that are held up in active accounting ledgers because they have not settled after an initial attempt to settle them;
   a data integrator, implemented in the processor, configured to
      receive vendor statements from the vendor in response to the audit request, wherein the vendor statements include one or more line items of an accounting ledger, which provides an accounting of a plurality of past business transactions between the vendor and the client, and wherein each of the one or more line items includes information regarding an amount payable to the vendor by the client,
      determine whether the one or more line items for the plurality of past business transactions include any open line items; and
      automatically marshal open line items of the one or more line items from the vendor statements based on a determination made by the data integrator that the open line items exist; and
   a content manager, implemented in the processor, configured to determine whether discrepancies exist from the marshalled open line items so as to thereby electronically audit the plurality of past business transactions between the client and the vendor, wherein the discrepancies include information regarding a credit amount to be applied against the amount payable due to a credit owed by the vendor to the client, and wherein the credit owed includes one or more of a duplicate payment made by the client to the vendor, a past overpayment made by the client to the vendor, a rebate provided to the client by the vendor, a discount provided to the client by the vendor, a missed shipment from the vendor to the client, and an unused credit owed by the vendor to the client.

2. The apparatus of claim 1, wherein the content manager is further configured to attempt to collect the discrepancies, when the discrepancies exist, wherein the attempt to collect includes one or more of issuing a check request to the vendor, deducting the credit amount from the amount payable in a remittance from the client to the vendor and, obtaining merchandise from the vendor.

3. The apparatus of claim 2, wherein the content manager is further configured to determine whether a related entity of the vendor exists.

4. The apparatus of claim 3, wherein the content manager is further configured to assign the discrepancies to the related entity of the vendor, if the related entity exists, wherein the attempt to collect is made to the related entity instead of the vendor.

5. The apparatus of claim 1, wherein the data acquirer is further configured to:
filter the vendor data from a vendor data file in response to making a determination that the vendor data file is not available in an electronic format, and
process the vendor data into a specified electronic format readable by the communication matrix.

6. The apparatus of claim 1, wherein the communication matrix is further configured to:
generate and send an initial contact message to the vendor using the vendor contact information; and
store the initial contact message in an audit database that maintains a running account of communications with the vendor.

7. The apparatus of claim 6, wherein the communication matrix is further configured to wait a predetermined amount of time for a response from the vendor.

8. The apparatus of claim 7, wherein the communication matrix is further configured to automatically generate and send a follow-up message to the vendor using the vendor contact information upon making a determination the predetermined amount of time elapsed and no response was received from the vendor.

9. The apparatus of claim 8, wherein the communication matrix is further configured to send the follow-up message to the vendor using an alternate communication method.

10. The apparatus of claim 9, wherein the alternate communication method is mail.

11. The apparatus of claim 9, wherein the alternate communication method is electronic mail.

12. The apparatus of claim 9, wherein the alternate communication method is facsimile.

13. The apparatus of claim 9, wherein the alternate communication method is phone.

14. The apparatus of claim 9, wherein the alternate communication method is courier.

15. The apparatus of claim 9, wherein the alternate communication method is overnight delivery.

16. The apparatus of claim 1, wherein the data integrator is further configured to evaluate the vendor statements and to capture the one or more line items from the vendor statements.

17. The apparatus of claim 16, wherein the data integrator is further configured to create a vendor statement record in response to receiving the vendor statements from the vendor.

18. An apparatus for performing electronic audits of vendor records, comprising:
a processor that is configured to
automatically acquire vendor data from a database in response to making a determination that an audit is to be performed,
wherein the vendor data includes vendor contact information associated with a vendor that performs business transactions with a client,
wherein said audit comprises an examination and verification of accounts and records related to said business transactions that includes reviewing disbursement transactions and related supporting data to identify and recover overpayments and under-deductions to said vendor, and
wherein said audit identifies transactions among said business transactions that comprise open line items that are held up in active accounting ledgers because they have not settled after an initial attempt to settle them;
automatically convert alternate database formats into a compatible database format by applying at least one translation filter in response to making a determination that the vendor data has been imported from the database in the alternate database formats;
send an audit request to the vendor upon acquiring the vendor data;
receive vendor statements from the vendor in response to the audit request,
wherein the vendor statements include one or more line items of an accounting ledger, which provides an accounting of a plurality of past business transactions between the vendor and the client, and
wherein each of the one or more line items includes information regarding an amount payable to the vendor by the client;
determine whether the one or more line items for the plurality of past business transactions include any open line items;
automatically marshal open line items of the one or more line items from the vendor statements based on a determination made by the processor that the open line items exist; and
determine whether discrepancies exist from the marshalled open line items so as to thereby electronically audit the plurality of past business transactions between the client and the vendor,
wherein the discrepancies include information regarding a credit amount to be applied against the amount payable due to a credit owed by the vendor to the client, and
wherein the credit owed includes one or more of a duplicate payment made by the client to the vendor, a past overpayment made by the client to the vendor, a rebate provided to the client by the vendor, a discount provided to the client by the vendor, a missed shipment from the vendor to the client and an unused credit owed by the vendor to the client.

19. The apparatus of claim 18, wherein the processor is further configured to:
attempt to collect the discrepancies, when the discrepancies exist, wherein the attempt to collect includes one or more of issuing a check request to the vendor, deducting the credit amount from the amount payable in a remittance from the client to the vendor and obtaining merchandise from the vendor.

20. The apparatus of claim 19, wherein the attempted collection of the discrepancies further comprises:
determining whether a related entity of the vendor exists.

21. The apparatus of claim 20, wherein the attempted collection of the discrepancies further comprises:
assigning the discrepancies to the related entity of the vendor, if the related entity exists, wherein the attempt to collect is made to the related entity instead of the vendor.

22. The apparatus of claim 18, wherein acquiring the vendor data further comprises:
filtering the vendor data from a vendor data file in response to making a determination that the vendor data file is not available in an electronic format; and
processing the vendor data into a specified electronic format readable by the processor.

23. The apparatus of claim 18, wherein sending the audit request to the vendor further comprises:
generating and sending an initial contact message to the vendor using the vendor contact information; and
storing the initial contact message in an audit database that maintains a running account of communications with the vendor.

24. The apparatus of claim 23, wherein sending the audit request to the vendor further comprises:
waiting a predetermined amount of time for a response from the vendor.

25. The apparatus of claim 24, wherein sending audit request to the vendor further comprises:
upon making a determination the predetermined amount of time elapsed and no response was received from the vendor, automatically generating and sending a follow-up message to the vendor using the vendor contact information.

26. The apparatus of claim 25, wherein the sending the follow-up message to the vendor is accomplished using an alternate communication apparatus.

27. The apparatus of claim 26, wherein the alternate communication apparatus uses mail.

28. The apparatus of claim 26, wherein the alternate communication apparatus uses electronic mail.

29. The apparatus of claim 26, wherein the alternate communication apparatus uses facsimile.

30. The apparatus of claim 26, wherein the alternate communication apparatus uses a phone.

31. The apparatus of claim 26, wherein the alternate communication apparatus uses a courier.

32. The apparatus of claim 26, wherein the alternate communication apparatus uses an overnight delivery service.

33. The apparatus of claim 18, wherein the receiving vendor statements from the vendor further comprises:
evaluating the vendor statements; and
capturing the line items from the vendor statements.

34. The apparatus of claim 33, wherein the processor is further configured to:
create a vendor statement record in response to receiving the vendor statements from the vendor.

35. A computer-readable medium, encoded with data and instructions, such that when executed by a processor the processor performs the steps of:
automatically retrieving vendor data from a database in response to making a determination that an audit is to be performed,
wherein the vendor data includes vendor contact information associated with a vendor that performs business transactions with a client;
automatically convert alternate database formats into a compatible database format by applying at least one translation filter in response to making a determination that the vendor data has been imported from the database in the alternate database formats;
sending an audit request to the vendor upon acquiring the vendor data,
wherein said audit comprises an examination and verification of accounts and records related to said business transactions that includes reviewing disbursement transactions and related supporting data to identify and recover overpayments and under-deductions to said vendor, and
wherein said audit identifies transactions among said business transactions that comprise open line items that are held up in active accounting ledgers because they have not settled after an initial attempt to settle them;
receiving vendor statements from the vendor in response to the audit request,
wherein the vendor statements include one or more line items of an accounting ledger, which provides an accounting of a plurality of past business transactions between the vendor and the client, and
wherein each of the one or more line items includes information regarding an amount payable to the vendor by the client;
determining whether the one or more line items for the plurality of past business transactions include any open line items;
automatically marshalling open line items of the one or more line items from the vendor statements based on a determination made by the processor that the open line items exist; and
determining whether discrepancies exist from the marshalled open line items so as to thereby electronically audit the plurality of past business transactions between the client and the vendor,
wherein the discrepancies include information regarding a credit amount to be applied against the amount payable due to a credit owed by the vendor to the client, and
wherein the credit owed includes one or more of a duplicate payment made by the client to the vendor, a past overpayment made by the client to the vendor, a rebate provided to the client by the vendor, a discount provided to the client by the vendor, a missed shipment from the vendor to the client and an unused credit owed by the vendor to the client.

36. The computer-readable medium of claim 35, further comprising instructions to:
attempt to collect the discrepancies, when the discrepancies exist, wherein the attempt to collect includes one or more of issuing a check request to the vendor, deducting the credit amount from the amount payable in a remittance from the client to the vendor and obtaining merchandise from the vendor.

37. The computer-readable medium of claim 36, wherein the attempted collection of the discrepancies further comprises instructions to:
determining whether a related entity of the vendor exists.

38. The computer-readable medium of claim 37, wherein the attempted collection of the discrepancies further comprises instructions to:
assign the discrepancies to the related entity of the vendor, if the related entity exists, wherein the attempt to collect is made to the related entity instead of the vendor.

39. The computer-readable medium of claim 35, wherein the acquisition of vendor data further comprises instructions to:
filter the vendor data from a vendor data file in response to making a determination that the vendor data file is not available in an electronic format; and
process the vendor data into a specified electronic format readable by the processor.

40. The computer-readable medium of claim 35, wherein sending the audit request to the vendor further comprises instructions to:
generate and send an initial contact message to the vendor using the vendor contact information; and
store the initial contact message in an audit database that maintains a running account of communications with the vendor.

41. The computer-readable medium of claim 40, wherein sending the audit request to the vendor further comprises instructions to:
wait a predetermined amount of time for a response from the vendor.

42. The computer-readable medium of claim 41, wherein sending the audit request to the vendor further comprises instructions to:
upon making a determination the predetermined amount of time elapsed and no response was received from the vendor, automatically generate and send a follow-up message to the vendor using the vendor contact information.

43. The computer-readable medium of claim 42, wherein sending the follow-up message to the vendor is accomplished using an alternate communication method.

44. The computer-readable medium of claim 43, wherein the alternate communication method is mail.

45. The computer-readable medium of claim 43, wherein the alternate communication method is electronic mail.

46. The computer-readable medium of claim 43, wherein the alternate communication method is facsimile.

47. The computer-readable medium of claim 43, wherein the alternate communication method is phone.

48. The computer-readable medium of claim 35, wherein the receiving vendor statements from the vendor further comprises instructions to:
evaluate the vendor statements; and
capture the one or more line items from the vendor statements.

49. The computer-readable medium of claim 48, wherein the receiving vendor statements from the vendor further comprises instructions to:
create a vendor statement record in response to receiving the vendor statements from the vendor.

50. A content manager for an auditing apparatus, comprising:
a processor that is configured to
retrieve vendor data for a vendor from a database;
automatically convert alternate database formats into a compatible database format by applying at least one translation filter in response to making a determination that the vendor data has been imported from the database in the alternate database formats;
send an audit request to the vendor based on the vendor data;
receive vendor statements from the vendor in response to the audit request; and
perform an audit by identifying discrepancies within the vendor statements received from the vendor that performs business transactions with a client,
wherein said audit comprises an examination and verification of accounts and records related to said business transactions that includes reviewing disbursement transactions and related supporting data to identify and recover overpayments and under-deductions to said vendor,
wherein said audit identifies transactions among said business transactions that comprise open line items that are held up in active accounting ledgers because they have not settled after an initial attempt to settle them,
wherein the vendor statements include one or more line items of an accounting ledger, which provides an accounting of a plurality of past business transactions between the vendor and the client,
wherein each of the one or more line items includes information regarding an amount payable to the vendor by the client, and
wherein the processor is further configured to
determine whether the one or more line items for the plurality of past business transactions include any open line items;
automatically marshal open line items of the one or more line items from the vendor statements based on a determination made by the processor that the open line items exist; and
determine whether discrepancies exist from the marshalled open line items so as to thereby electronically audit the plurality of past business transactions between the client and the vendor,
wherein the discrepancies include information regarding a credit amount to be applied against the amount payable due to a credit owed by the vendor to the client, and
wherein the credit owed includes one or more of a duplicate payment made by the client to the vendor, a past overpayment made by the client to the vendor, a rebate provided to the client by the vendor, a discount provided to the client by the vendor, a missed shipment from the vendor to the client and an unused credit owed by the vendor to the client.

51. The content manager of claim 50, wherein the processor is further configured to:
attempt to collect the discrepancies, when the discrepancies exist, wherein the attempt to collect includes one or more of issuing a check request to the vendor, deducting the credit amount from the amount payable in a remittance from the client to the vendor and obtaining merchandise from the vendor.

52. The content manager of claim 51, wherein the attempted collection of the discrepancies further comprises:
determining whether a related entity of the vendor exists.

53. The content manager of claim 52, wherein the attempted collection of the discrepancies further comprises:
assigning the discrepancies to the related entity of the vendor, if the related entity exists, wherein the attempt to collect is made to the related entity instead of the vendor.

54. A computer-readable medium, encoded with data and instructions for electronically performing an audit of vendor records, such that when executed by a processor, the processor performs the steps of:
retrieving vendor data for a vendor from a database;
converting alternate database formats into a compatible database format by applying translation filters to the vendor data in response to making a determination that the vendor data has been imported from the database in the alternate database formats;
sending an audit request to the vendor based on the vendor data;
receiving vendor statements from the vendor in response to sending the audit request to the vendor,
wherein said audit comprises an examination and verification of accounts and records related to said business transactions that includes reviewing disbursement transactions and related supporting data to identify and recover overpayments and under-deductions to said vendor,
wherein said audit identifies transactions among said business transactions that comprise open line items that are held up in active accounting ledgers because they have not settled after an initial attempt to settle them,
wherein the vendor statements include one or more line items of an accounting ledger, which provides an accounting of a plurality of past business transactions between the vendor and the client, and
wherein each of the one or more line items includes information regarding an amount payable to the vendor by the client;
determining whether the one or more line items for the plurality of past business transactions include any open line items;
automatically marshalling open line items of the one or more line items from the vendor statements based on a determination made by the processor that the open line items exist; and
determining whether discrepancies exist from the marshalled open line items so as to thereby electronically audit the plurality of past business transactions between the client and the vendor,
wherein the discrepancies include information regarding a credit amount to be applied against the amount payable due to a credit owed by the vendor to the client, and
wherein the credit owed includes one or more of a duplicate payment made by the client to the vendor, a past overpayment made by the client to the vendor, a rebate provided to the client by the vendor, a discount provided to the client by the vendor, a missed shipment from the vendor to the client and an unused credit owed by the vendor to the client.

55. The computer-readable medium of claim 54, further comprising instructions to:
attempt to collect the discrepancies, when the discrepancies exist, wherein the attempt to collect includes one or more of issuing a check request to the vendor, deducting the credit amount from the amount payable in a remittance from the client to the vendor and obtaining merchandise from the vendor.

56. The computer-readable medium of claim 55, wherein the attempted collection of the discrepancies further comprises:
determining whether a related entity of the vendor exists.

57. The computer-readable medium of claim 56, wherein the attempted collection of the discrepancies further comprises:
assign the discrepancies to the related entity of the vendor, if the related entity exists, wherein the attempt to collect is made to the related entity instead of the vendor.

58. The apparatus of claim 1, wherein the vendor is one of a plurality of vendors that perform business transactions with the client, and wherein the step of acquiring the vendor data includes identifying the vendor from among the plurality of vendors, and wherein the step of sending the audit request is performed using the acquired vendor contact information.

59. The apparatus of claim 58, wherein the step of receiving the vendor statements includes using OCR on the received vendor statements to identify the vendor from among the plurality of vendors.

* * * * *